(12) United States Patent
Brady et al.

(10) Patent No.: US 10,902,396 B1
(45) Date of Patent: Jan. 26, 2021

(54) SPLIT-THE-BILL FEATURE IN REAL-TIME ACCOUNT-TO-ACCOUNT PAYMENTS

(71) Applicant: United Services Automobile Association (USAA), San Antonio, TX (US)

(72) Inventors: John Weatherman Brady, San Antonio, TX (US); Christopher J. Cox, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 313 days.

(21) Appl. No.: 15/837,153

(22) Filed: Dec. 11, 2017

Related U.S. Application Data

(60) Provisional application No. 62/434,867, filed on Dec. 15, 2016.

(51) Int. Cl.
*G06Q 20/14* (2012.01)
*G06Q 20/22* (2012.01)

(52) U.S. Cl.
CPC .......... *G06Q 20/14* (2013.01); *G06Q 20/223* (2013.01); *G06Q 20/29* (2013.01)

(58) Field of Classification Search
CPC .................................................... G06Q 40/00
USPC ......................................................... 705/38
See application file for complete search history.

(56) References Cited

U.S. PATENT DOCUMENTS

| | | | | |
|---|---|---|---|---|
| 6,088,686 A * | 7/2000 | Walker | ............... | G06Q 20/10 235/375 |
| 7,860,781 B1 * | 12/2010 | Bodi | ............... | G06Q 40/00 705/35 |
| 8,185,466 B2 * | 5/2012 | Martinez | ............... | G06Q 40/04 705/37 |
| 8,626,644 B2 * | 1/2014 | Greig, Jr. | ............... | G06Q 40/00 235/375 |
| 9,875,469 B1 * | 1/2018 | Chin | ............... | G06Q 20/14 |
| 9,990,621 B1 * | 6/2018 | Ng | ............... | G06Q 20/29 |
| 10,482,449 B1 * | 11/2019 | Gantert | ............... | G06Q 20/223 |
| 2002/0069160 A1 * | 6/2002 | Olin | ............... | G06Q 40/00 705/38 |
| 2002/0091621 A1 * | 7/2002 | Conklin | ............... | G06Q 20/10 705/37 |
| 2003/0009409 A1 * | 1/2003 | Homer | ............... | G06Q 40/02 705/36 R |
| 2003/0144950 A1 * | 7/2003 | O'Brien | ............... | G06Q 40/02 705/38 |
| 2005/0080722 A1 * | 4/2005 | Kemper | ............... | G06Q 40/02 705/38 |

(Continued)

Primary Examiner — Kirsten S Apple
(74) Attorney, Agent, or Firm — Fish & Richardson P.C.

(57) ABSTRACT

Implementations of the present disclosure include receiving transaction data for a transaction that is to be executed between a first user and a second user by a computer-implemented P2P payment system, the transaction data including negotiable instrument data provided from a physical negotiable instrument that is provided by the second user and that is to be used in the transaction, the first user being a user of the P2P payment system, and the second user being a non-user of the P2P payment system, processing, the transaction data to execute the transaction, and transmitting a notification to at least one of the first user and the second user, the notification providing information regarding the transaction.

15 Claims, 4 Drawing Sheets

(56) References Cited

U.S. PATENT DOCUMENTS

| | | | |
|---|---|---|---|
| 2005/0149421 A1* | 7/2005 | Marlowe-Noren | G06Q 40/00 705/35 |
| 2005/0273406 A1* | 12/2005 | Lebda | G06Q 40/00 705/35 |
| 2007/0016519 A1* | 1/2007 | Blount, Jr. | G06Q 10/087 705/38 |
| 2007/0017976 A1* | 1/2007 | Peyret | G07F 7/1008 235/380 |
| 2007/0142925 A1* | 6/2007 | Heinzmann | G06F 16/24532 700/1 |
| 2007/0192237 A1* | 8/2007 | Duoos | G06Q 40/02 705/38 |
| 2008/0126267 A1* | 5/2008 | Rosen | G06Q 40/06 705/36 R |
| 2008/0243569 A1* | 10/2008 | Hadden | G06Q 20/10 705/38 |
| 2008/0249809 A1* | 10/2008 | Rosen | G06Q 40/00 705/4 |
| 2010/0078472 A1* | 4/2010 | Lin | G06O 20/405 235/379 |
| 2010/0228651 A1* | 9/2010 | Becerra | G06Q 30/04 705/34 |
| 2011/0191233 A1* | 8/2011 | Russo | G06Q 40/04 705/37 |
| 2012/0278256 A1* | 11/2012 | Williams | G06Q 40/06 705/36 R |
| 2014/0081672 A1* | 3/2014 | Chawla | G06Q 40/08 705/4 |
| 2014/0180907 A1* | 6/2014 | Blank | G06Q 40/025 705/38 |
| 2017/0124540 A1* | 5/2017 | Chan | G06Q 20/3224 |

\* cited by examiner ical advancement has enabled unconventional
SPLIT-THE-BILL FEATURE IN REAL-TIME ACCOUNT-TO-ACCOUNT PAYMENTS

CROSS-REFERENCE TO RELATED APPLICATION

This application claims priority to U.S. Provisional Application Ser. No. 62/434,867, filed on Dec. 15, 2016, the entirety of which is incorporated by reference into the present disclosure.

BACKGROUND

Technolog payment channels for funds to be transferred between parties. For example, so-called account-to-account payment systems (e.g., person-to-person (or peer-to-peer) (P2P) payment systems) have been enabled, some such systems leveraging mobile devices, and mobile applications executed thereon. For example, a P2P payment system enables a party to transfer funds from one account directly into an account of another party based on an identifier, such as an email address or a mobile telephone number.

SUMMARY

This specification relates to enabling non-users of a computer-implemented account-to-account payment system (also referred to as person-to-person (or peer-to-peer) (P2P) payment system herein) to participate in transactions in the computer-implemented account-to-account payment system.

In general, innovative aspects of the subject matter described in this specification can be embodied in methods that include actions of receiving transaction data for a transaction that is to be executed between a first user and a second user by a computer-implemented P2P payment system, the transaction data including negotiable instrument data provided from a physical negotiable instrument that is provided by the second user and that is to be used in the transaction, the first user being a user of the P2P payment system, and the second user being a non-user of the P2P payment system, processing, the transaction data to execute the transaction, and transmitting a notification to at least one of the first user and the second user, the notification providing information regarding the transaction. Other implementations of this aspect include corresponding systems, apparatus, and computer programs, configured to perform the actions of the methods, encoded on computer storage devices.

These and other implementations can each optionally include one or more of the following features: the transaction data includes a unique identifier associated with an account of the first user, and an amount of the physical negotiable instrument to be credited to the account of the first user through the transaction; the negotiable instrument data is provided based on an image of the negotiable instrument, and processing the image using optical character recognition (OCR); the negotiable instrument data is received from a computing device of the first user; the negotiable instrument data is included in the transaction data at least partially in response to the first user selecting a split-the-transaction option for the transaction; the transaction data further includes a unique user identifier associated with a third user, and an amount to be transferred to an account of the first user from the third user during the transaction, the third user being a user of the P2P payment system; and the physical negotiable instrument includes a check.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to enabling non-users of a computer-implemented account-to-account payment system to participate in transactions in the computer-implemented account-to-account payment system (e.g., person-to-person (or peer-to-peer) (P2P) payment systems). More particularly, implementations of the present disclosure enable physical, negotiable instruments to be used in a transaction conducted through a computer-implemented P2P payment system. In some implementations, actions include receiving transaction data for a transaction that is to be executed between a first user and a second user by a computer-implemented P2P payment system, the transaction data including negotiable instrument data provided from a physical negotiable instrument that is provided by the second user and that is to be used in the transaction, the first user being a user of the P2P payment system, and the second user being a non-user of the P2P payment system, processing, the transaction data to execute the transaction, and transmitting a notification to at least one of the first user and the second user, the notification providing information regarding the transaction.

Figure 1:
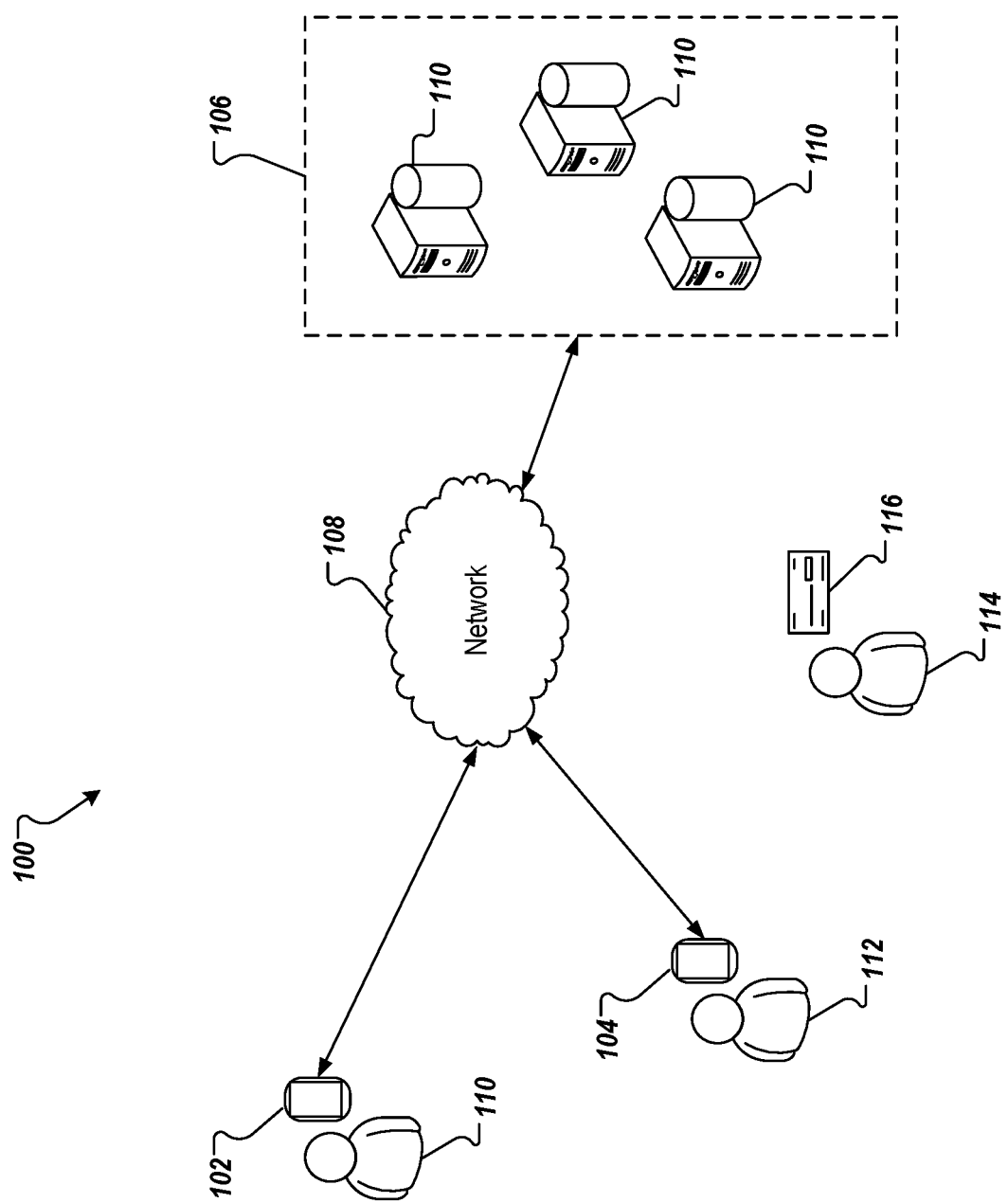
FIG. 1 depicts an example environment that can be used to execute implementations of the present disclosure.

FIG. 1 depicts an example environment 100 that can be used to execute implementations of the present disclosure. In some examples, the example environment 100 enables users to transfer funds between accounts using computing devices in a computer-implemented account-to-account payment system. The example environment 100 includes computing devices 102, 104, a back-end system 106, and a network 108. In some examples, the computing devices 102, 104 are used by respective users 110, 112 to log into and interact with the back-end system 106 over the network 108, and participate in a transaction using a P2P payment system that the users 110, 112 are registered users of. In some examples, a user 114 can participate in the transaction as a non-registered user (non-user) of the P2P payment system, participating using a physical negotiable instrument 116, in accordance with implementations of the present disclosure.

In the depicted example, the computing devices 102, 104 are provided as mobile computing devices. It is contemplated, however, that implementations of the present disclosure can be realized with any appropriate computing device (e.g., smartphone, tablet, laptop computer, voice enabled devices). In some examples, the network 108 includes a local area network (LAN), wide area network (WAN), the Internet, or a combination thereof, and connects web sites, user devices (e.g., computing devices 102, 104), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 110. In some examples, the at least one server system 110 hosts one or more computer-implemented services that users can interact with using computing devices. For example, the computing devices 102, 104 can be used to communicate with a service hosted by the back-end system 106 over the network 108. In some examples, the computing devices 102, 104 each includes a computer-executable application executed thereon, which can be used to log into the service and establish a communication session between the computing device 102, 104 and the back-end system 106. In some examples, the computing devices 102, 104 each includes a web browser application executed thereon, which can be used to display one or more web pages of the service, the user interacting with the service through the web page(s).

In the context of the present disclosure, a service includes P2P payment system. In some examples, the P2P payment system leverages mobile applications to enable users to directly transfer funds to each other's accounts (e.g. checking, savings). Example P2P payment systems include, without limitation, Venmo, Snapcash, Square Cash, Zelle, and clearXchange. In the example of FIG. 1, the P2P payment system can be hosted on one or more server systems of the back-end system 106, and can be accessed by the users 110, 112 using the respective computing devices 102, 104. For example, the users 110, 112 can be registered users with the P2P payment system. In some implementations, each user 110, 112 can establish a user profile to access the P2P payment system hosted by a back-end system 106. In some examples, the user profile includes user-specific information. Example user-specific information can include, without limitation, username, password, email address, mobile telephone number, and account information (e.g., specifying an account to/from which funds can be transferred using the P2P payment system).

To provide context for implementations of the present disclosure, computer-implemented P2P payment systems enable users to execute real-time money transfers between respective accounts. In some examples, the user's account is associated with an identifier that is unique to the user (e.g., a unique user identifier). Example unique user identifiers include, without limitation, an email address, and a mobile telephone number. Within a traditional computer-implemented P2P payment system, one account is associated with the unique user identifier, and is the account to/from which transactions can be executed.

In a traditional computer-implemented P2P payment system, an example transaction can include a first user, having a user account established in the P2P payment system, transferring money to a second user, also having a user account established in the P2P payment system. In some examples, the first user accesses an application executed on a computing device (e.g., a mobile app executing on a smartphone) to conduct the transfer through their user account. In some examples, the first user is associated with a first unique user identifier within the application. For example, when setting up a user account profile for using the application, the first user provides the first unique identifier (e.g., an email address, a username, a mobile number), and an account (e.g., checking account, savings account), to which the first user identifier is linked. The first user inputs an amount, and a unique user identifier associated with a payee (second user). In the instant example, the first user inputs a second unique user identifier, which is associated with the second user, and is linked to an account (e.g., checking account, savings account) of the second user. The first user executes the transaction, and the funds are transferred from the account linked to the first unique user identifier to the account linked with the second unique user identifier.

However, in traditional P2P payment systems, parties are required to be users of the particular P2P payment system (e.g., be registered users of the P2P payment system). For example, a user of a P2P payment system has a user account established with the P2P system, and at least one account for conducting transactions to/from using the P2P payment system. Non-users of the P2P system are unable to participate in a transaction. A non-user can be described as a party that does not have a user account established with the P2P payment system.

In accordance with implementations of the present disclosure, a computer-implemented P2P payment system enables non-users of the P2P payment system to participate in transactions conducted through the P2P system. More specifically, and in some implementations, a non-user can participate in a transaction using a physical, negotiable instrument. Example negotiable instruments can include, without limitation, promissory notes, bills of exchange, banknotes, checks (e.g., personal, business, cashier, teller, treasury, government, certified, official, payment, loan), virtual checks, money orders, bill payments, proofs of payment, and instruments encoded in machine-readable codes (e.g., barcodes, QR codes). Implementations of the present disclosure will be described in further detail herein with reference to checks. It is contemplated, however, that implementations of the present disclosure can be performed using any appropriate negotiable instrument.

In some implementations, a user of a P2P payment system can establish a profile with a P2P payment system, as introduced above. For example, the user can establish an account with the P2P payment system, and can provide credentials for the account (e.g., username, password, biometric data). In some examples, the credentials are used by the user to log into the P2P payment system, and access their account. In some examples, the user provides account information for at least one account held at one or more enterprises (e.g., financial institutions) for use in funds transfers. In some examples, the account information can include a routing number and an account number.

Figure 2:
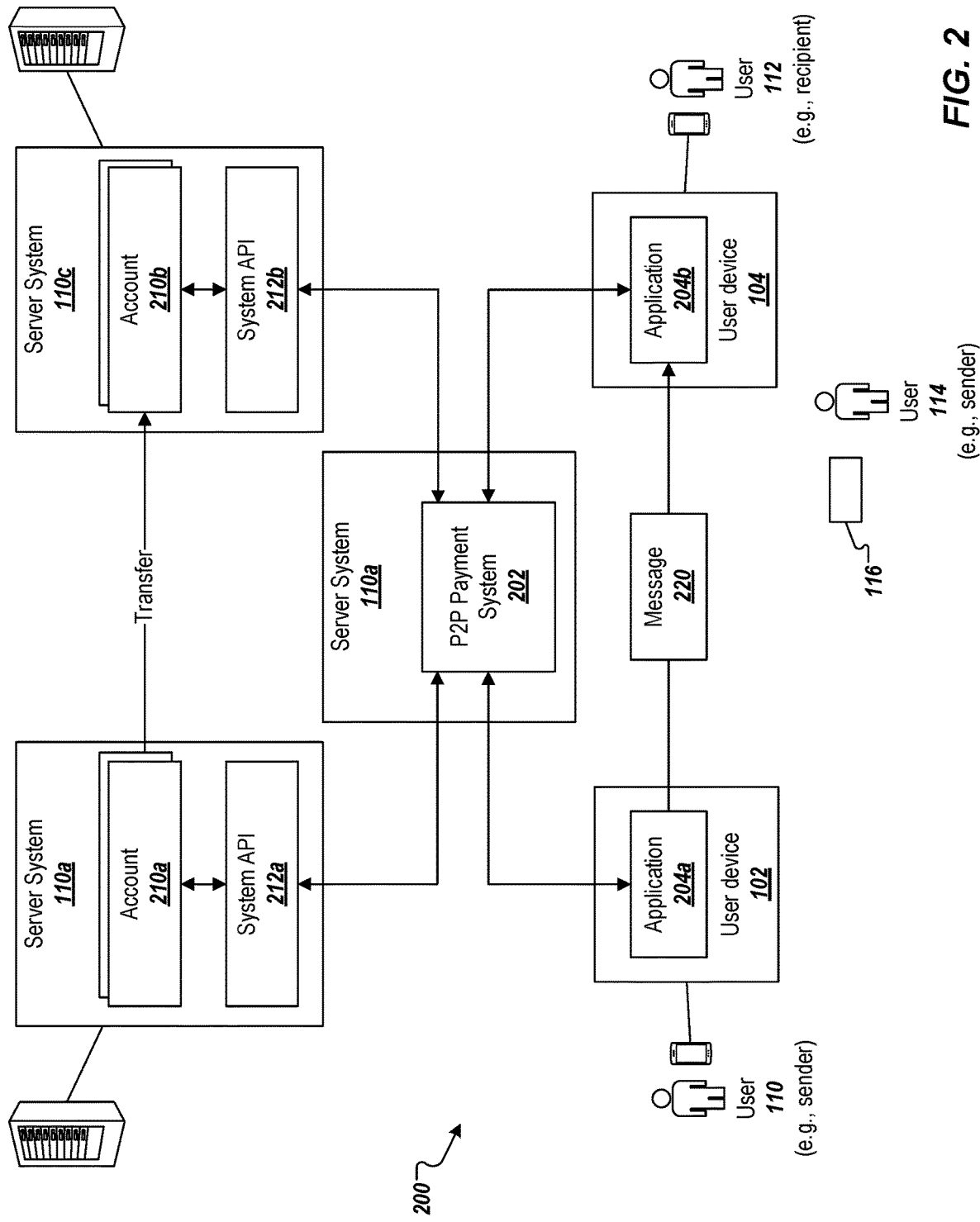
FIG. 2 depicts an example system for transferring funds between accounts in accordance with implementations of the present disclosure.

FIG. 2 depicts an example system 200 for transferring funds between accounts in accordance with implementations of the present disclosure. The devices and software modules depicted in FIG. 2 can communicate with one another over one or more networks (e.g., the network 108 of FIG. 1), including wired and/or wireless network(s) of any type that support any communication protocol(s). Such communications may be encrypted or otherwise secured to prevent unauthorized access to the communicated information.

In the example of FIG. 2, the users 110, 114 (e.g., as senders) may request to transfer funds to the user 112 (e.g., as recipient). In some examples, a computer-implemented P2P payment system 202 provides a P2P payment service, which the users 110, 112 use to execute the fund transfer. For example, the respective computing devices 102, 104 execute respective applications 204a, 204b (e.g., mobile apps), which enable communication with the P2P payment system 202. The applications 204a, 204b can be collectively referenced as the application 204. In some examples, the application 204 can be digital wallets, or may access digital wallets, and/or can be payment system—specific mobile applications (e.g., downloaded and installed from an application store (app store)) executing on the computing devices 102, 104 respectively. In some examples, the application 204 enables the sender and/or recipient to enter account information such as an account number and routing transit number for an account at a bank or other institution.

In some implementations, the P2P payment system 202, and the application 204 can be provided by an enterprise (e.g., financial institution) holding accounts of the sender and/or recipient. In some implementations, the P2P payment system 202, and the application 204 can be provided by a third-party service provider. In the depicted example, the P2P payment system 202 is hosted on a server system 110a, which can be owned and/or operated by or on behalf of the enterprise, or the third-party.

In the depicted example, the user 114 is a non-user of the P2P payment system. For example, and as described in further detail herein, the user 114 does not have a user account registered with the P2P payment system. However, in accordance with implementations of the present disclosure, and as described in further detail herein, the user 114 is able to participate in a transaction through the P2P payment system using the negotiable instrument. For example, the user 114 can draft the negotiable instrument 116 (e.g., fill out a check), and provide the negotiable instrument 116 to the user 112. The user 112 can use the computing device 104 to provide payment information from the negotiable instrument for the transaction being executed through the P2P payment system.

In some examples, the account information for the senders and the recipient may be communicated from the computing device(s) 102, 104 to the P2P payment system 202. The account information for the sender may be communicated in a sender token from the computing device 102 to the P2P payment system 202, and the account information for the recipient may be communicated in a recipient token from the user computing 104 to the P2P payment system 202. The account information for the sender and/or recipient may be stored (e.g., as tokens) by the P2P payment system 202, and accessed to facilitate funds transfers between the parties.

In some examples, the account information for the sender describes at least one account 210a (e.g., savings account, checking account) managed by a server system 110b for a first enterprise (e.g., financial institution). In some examples, the account information for the recipient can describe at least one account 210b managed by a server system 110c for a second institution (e.g., financial institution). Although examples herein may describe the sender and recipient as having accounts managed by different institutions, in some examples the sender and recipient may have accounts at the same institution.

As described above, the sender and/or recipient may be authenticated to access features and/or information provided by the application 204. Authentication may include verifying credentials provided by the sender and/or recipient, verifying user identity through biometric authentication methods, and/or other forms of authentication.

The sender may use the application 204a to request a transfer of funds to the recipient. The sender may enter, through the application 204a, an amount to transfer (e.g., $50), and an identifier associated with the recipient, to which the funds are to be transferred. In response to the request, the application 204a may send a message 220 that may be received at the computing device 104, and accessed by the recipient using the application 204b. On receiving the message 220, the recipient may indicate, through the application 204b, whether the funds transfer is to be allowed or disallowed. The application 204b may communicate this decision to the P2P payment system 202. Although, in the example of FIG. 2, the message 220 is depicted as directly communicated from the computing device 102 to the computing device 104, it is contemplated that any appropriate channel of communication can be used. For example, the message 220 can be transmitted through the network 108, and/or the P2P payment system 202. If the funds transfer is approved, the P2P payment system 202 initiates the funds transfer from the one or more accounts 210a to the one or more accounts 210b.

Implementations of the present disclosure support a variety of mechanisms for the funds transfer. In some implementations, the funds transfer employs a mechanism (e.g., a rail) that is independent of, and/or separate from, any credit card network. In the example of FIG. 2, the funds transfer may be a (e.g., direct) transfer between the accounts 210a, 210b using a mechanism such as that provided by the Automated Clearing House (ACH). In some examples, the mechanism for transfer may be a commercial P2P network, which provide real time notification of the funds being transferred with an ACH settlement. In some examples, the mechanism for transfer may be a (e.g., closed) bilateral network between the institutions. The P2P payment system 202 may access the account information for the sender and recipient, and request that the server system 110a initiate a transfer of funds from the account(s) 210a (e.g., having respective account number(s), and routing transit number(s)) to the account(s) 210b (e.g., having respective account number(s), and routing transit number(s)). In some implementations, the P2P payment system 202 may send a notification to the applications 204 to notify the sender and recipient that the funds transfer has been performed.

In some implementations, the P2P payment system 202 can communicate with the server systems 110 through respective application protocol interfaces (APIs) 212a, 212b executing on the server systems 110b, 110c. In some examples, the APIs 212a, 212b can provide RESTful endpoints that enable communications between their respective server systems 110, and other systems such as the P2P payment system 202.

In some implementations, the P2P payment system 202 may itself provide a mechanism or rail for funds transfer instead of employing a third party mechanism, such as ACH. For example, the P2P payment system 202 may employ holding accounts to perform the transfer. In some examples, a first holding account can be associated with the first institution (e.g., of the sender), and a second holding account may be associated with the second institution (e.g., of the recipient). On receiving approval of the funds transfer from the recipient, the P2P payment system 202 can debit the first holding account the transferred amount, and credit the second holding account the transferred amount. The P2P payment system 202, and/or API(s) can later perform settlement operations to debit and credit the appropriate accounts.

In accordance with implementations of the present disclosure, the user 113, as a non-user of the P2P payment system may participate in the transaction. An example transaction is described in further detail herein with reference to FIGS. 2 and 3.

Figure 3:
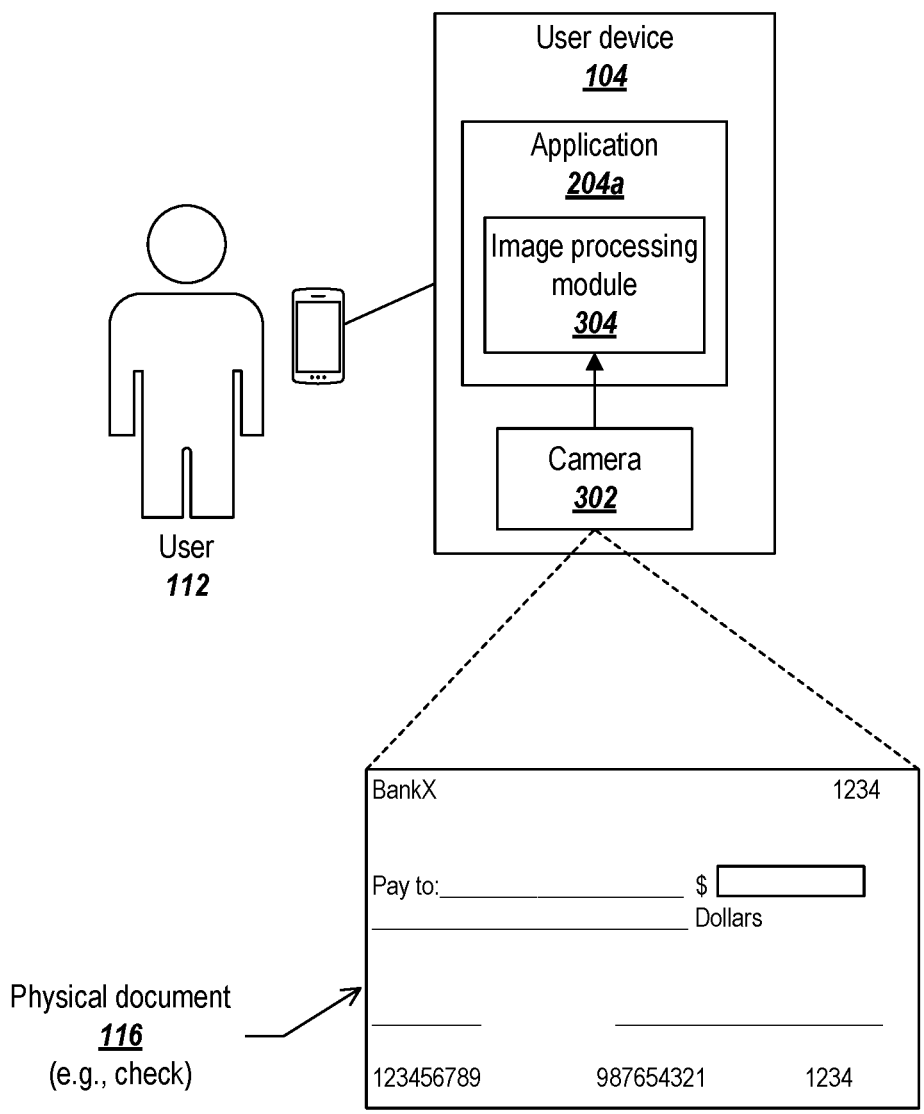
FIG. 3 depicts an example of use of a physical negotiable instrument in an example transaction using a P2P payment system.

FIG. 3 depicts an example of use of the physical negotiable instrument 116 in an example transaction using a P2P payment system. In some implementations, the computing device 104 includes one or more scanning components. In the depicted example, the computing device 104 includes a scanning component that is an image capture device such as a camera 302. Implementations of the present disclosure also support the use of appropriate scanning components to scan physical documents, or other physical objects, and determine account information and payment information based on the scan. The camera 302 may be configured to capture still images and/or video data. The application 204a may include an image processing module 304. The user 112 may select a feature of the application 204a to request that account information be captured from the physical negotiable instrument 116 (e.g., a check). The application 204a may instruct the camera 302 to generate one or more images, or video data, of the physical document 116. Such image and/or video data may be analyzed by the image processing module 304 to determine the account information, such as the account number, routing transit number, institution (e.g., bank) name, user name, and so forth, and payment information, such as the recipient, date, memo, and an amount. The account information and the payment information can be determined using any appropriate optical character recognition (OCR) technique to determine text data from the image.

In accordance with implementations of the present disclosure, the account information and the payment information can be included in a transaction data set, which can be provided to the P2P payment system for use in a transaction conducted through the P2P payment system. For example, the application 204a can communicate the account information and the payment information (e.g., as part of a transaction data set) to the P2P payment system to enable transfer of funds from an account of the user 114 to an account of the user 112.

Implementations of the present disclosure are described in the following example use case. The example use case includes multiple users that are to provide respective payments for a transaction to another user. For example, and with reference to FIGS. 1-3, the user 112 pays for a transaction involving the users 110, 112, 114 (e.g., the users 110, 112, 114 are splitting a tab for lunch at a restaurant, but the user 112 pays the tab with the restaurant). Accordingly, the user 110 and the user 114 contribute respective payments for the transaction to credit an account of the user 112 through the P2P payment system 202. In the example use case, and as described above, the users 110, 112 are registered users of the P2P payment system, and the user 114 is a non-user of the P2P payment system 202. The user 112 pays for the transaction using the P2P payment system (e.g., transfers funds from an account to an account of the restaurant using the P2P payment system 202), and selects a split-the-transaction option (e.g., provided by the application 204a).

In response to user selection of the split-the-transaction option, it is requested that the user 112 add at least one sender (e.g., payer) to the transaction. In some examples, it can be requested that the user 112 input the number of payees involved in the transaction, and, for each payee (minus the user 112) payment information is requested. In some examples, for respective payees, the user can select a user-payer option, or a non-user-payer option. In accordance with the present example, the user selects the user-payer option to add the user 110 to the transaction, and selects the non-user-payer option to add the user 114 to the transaction. For example, in response to selection of the user-payer option, the user 112 is requested (e.g., by the application 204a) to input a unique user identifier assigned to the payee, and the user 112 can input the unique user identifier of the user 110 (e.g., email address, telephone number), as registered with the P2P payment system. The user 112 can also input an amount that the user 110 is to pay (e.g., if not already input, or calculated by the application 204a).

In response to selection of the non-user-payer option, the user 112 is requested (e.g., by the application 204a) to input payment information for a non-user (e.g., the user 114, not registered with the P2P payment system). In some examples, the user 112 can be provided with one or more options for inputting payment information, at least one option including image capture of a negotiable instrument. Accordingly, the user 114, being a non-user of the P2P payment system provides the physical negotiable instrument 116 to make payment to the user 112. The user 112 uses the application 204a to capture an image of the negotiable instrument 116, which can be processed as described herein, and added to the transaction conducted through the P2P payment system.

Figure 4:
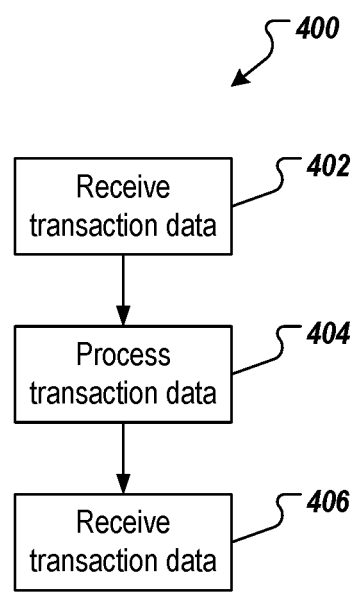
FIG. 4 depicts an example process that can be executed in accordance with implementations of the present disclosure.

FIG. 4 depicts an example process 400 that can be executed in accordance with implementations of the present disclosure. The example process 400 can be provided by one or more computer-executable programs executed by one or more computing devices. The examples process 400 can be executed to conduct transactions using a P2P payment system in accordance with implementations of the present disclosure.

Transaction data is received (402). For example, transaction data for a transaction that is to be executed between a first user and a second user by a computer-implemented P2P payment system (e.g., the P2P payment system of FIG. 2). In some examples, the transaction data includes negotiable instrument data provided from a physical negotiable instrument (e.g., the negotiable instrument 116 of FIGS. 1-3) that is provided by the second user and that is to be used in the transaction. In some examples, the first user is a user of the P2P payment system, and the second user is a non-user of the P2P payment system. The transaction data is processed to execute the transaction (404). For example, the P2P payment system processes the transaction data to transfer funds from the second user to the first user through a P2P transaction. One or more notifications are transmitted (406). For example, the P2P payment system transmits a notification to at least one of the first user and the second user, the notification providing information regarding the transaction.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:
   receiving, by the at least one processor, from a computing device of a first user, transaction data for a payment transaction that is to be executed between (i) the first user acting on behalf of a plurality of users and (ii) a third party, wherein the plurality of users comprises the first user and the second user, the transaction data comprising negotiable instrument data provided based on an image of a physical negotiable instrument that is provided by the second user to the first user and that is to be used in the transaction, the first user and the third party being users of a computer-implemented person-to-person (P2P) payment system, the first user having a first account established with the P2P system, the third party having a second account established with the P2P system, and the second user being a non-user of the P2P payment system who does not have a user account established with the P2P system;
   processing, by the at least one processor, the transaction data to execute the transaction between the first user and the third party through the P2P system, wherein processing the transition data comprises processing the image using optical character recognition; and
   transmitting, by the at least one processor, a notification to the first user, the notification providing information regarding the transaction.

2. The method of claim 1, wherein the transaction data comprises a unique identifier associated with an account of the first user, and an amount of the physical negotiable instrument to be credited to the account of the first user through the transaction.

3. The method of claim 1, wherein the negotiable instrument data is included in the transaction data at least partially in response to the first user selecting a split-the-transaction option for the transaction.

4. The method of claim 1, wherein the plurality of users includes a third user and wherein the transaction data further comprises a unique user identifier associated with the third user, and an amount to be transferred to an account of the first user from the third user, the third user being a user of the P2P payment system.

5. The method of claim 1, wherein the physical negotiable instrument comprises a check.

6. A system comprising:
   a data store for storing data; and
   at least one processor configured to interact with the data store, the at least one processor being further configured to execute computer-readable instructions to perform operations comprising:
      receiving, from a computing device of a first user, transaction data for a payment transaction that is to be executed between (i) the first user acting on behalf of a plurality of users and (ii) a third party, wherein the plurality of users comprises the first user and the second user, the transaction data comprising negotiable instrument data provided based on an image of a physical negotiable instrument that is provided by the second user to the first user and that is to be used in the transaction, the first user and the third party being users of a computer-implemented person-to-person (P2P) payment system, the first user having a first account established with the P2P system, the third party having a second account established with the P2P system, and the second user being a non-user of the P2P payment system who does not have a user account established with the P2P system,
      processing the transaction data to execute the transaction between the first user and the third party through the P2P system, wherein processing the transition data comprises processing the image using optical character recognition, and
      transmitting a notification to the first user, the notification providing information regarding the transaction.

7. The system of claim 6, wherein the transaction data comprises a unique identifier associated with an account of the first user, and an amount of the physical negotiable instrument to be credited to the account of the first user through the transaction.

8. The system of claim 6, wherein the negotiable instrument data is included in the transaction data at least partially in response to the first user selecting a split-the-transaction option for the transaction.

9. The system of claim 6, wherein the transaction data further comprises a unique user identifier associated with a third user, and an amount to be transferred to an account of the first user from the third user, the third user being a user of the P2P payment system.

10. The system of claim 6, wherein the physical negotiable instrument comprises a check.

11. A non-transitory computer-readable storage medium coupled to one or more processors and having instructions stored thereon which, when executed by the one or more processors, cause the one or more processors to perform operations comprising:

receiving, from a computing device of a first user, transaction data for a payment transaction that is to be executed between (i) the first user acting on behalf of a plurality of users and (ii) a third party, wherein the plurality of users comprises the first user and the second user, the transaction data comprising negotiable instrument data provided based on an image of a physical negotiable instrument that is provided by the second user to the first user and that is to be used in the transaction, the first user and the third party being users of a computer-implemented person-to-person (P2P) payment system, the first user having a first account, established with the P2P system, the third party having a second account established with the P2P system, and the second user being a non-user of the P2P payment system who does not have a user account established with the P2P system;

processing the transaction data to execute the transaction between the first user and the third party through the P2P system, wherein processing the transition data comprises processing the image using optical character recognition; and transmitting a notification to the first user, the notification providing information regarding the transaction.

12. The computer-readable storage medium of claim 11, wherein the transaction data comprises a unique identifier associated with an account of the first user, and an amount of the physical negotiable instrument to be credited to the account of the first user through the transaction.

13. The computer-readable storage medium of claim 11, wherein the negotiable instrument data is included in the transaction data at least partially in response to the first user selecting a split-the-transaction option for the transaction.

14. The computer-readable storage medium of claim 11, wherein the transaction data further comprises a unique user identifier associated with a third user, and an amount to be transferred to an account of the first user from the third user, the third user being a user of the P2P payment system.

15. The computer-readable storage medium of claim 11, wherein the physical negotiable instrument comprises a check.

* * * * *